United States Patent [19]
Paul

[11] 4,095,926
[45] Jun. 20, 1978

[54] APPARATUS FOR DEPOSITING DOUGH ONTO PANS THEREFOR

[76] Inventor: Wray D. Paul, 135 Hattaway Dr., Altamonte Springs, Fla. 32701

[21] Appl. No.: 681,028

[22] Filed: Apr. 28, 1976

[51] Int. Cl.² .......................................... A21C 11/10
[52] U.S. Cl. .................................. 425/307; 198/457; 198/607; 425/337
[58] Field of Search ................ 425/306, 307, 308, 89, 425/337; 198/607, 456, 457

[56] References Cited

U.S. PATENT DOCUMENTS

| | | | |
|---|---|---|---|
| 698,814 | 4/1902 | Chase et al. | 425/89 |
| 1,134,970 | 4/1915 | Lawrence | 425/337 |
| 1,489,926 | 4/1924 | Burtchaell | 198/457 X |
| 2,226,323 | 12/1940 | Pointon | 198/607 X |
| 2,919,664 | 1/1960 | Marasso | 425/308 X |
| 2,938,474 | 5/1960 | Fitler | 425/308 X |
| 3,724,980 | 4/1973 | Lossmann et al. | 425/306 X |

FOREIGN PATENT DOCUMENTS

| | | | |
|---|---|---|---|
| 1,029,764 | 5/1958 | Germany | 425/220 |
| 1,906,683 | 9/1970 | Germany | 425/308 |

*Primary Examiner*—Richard B. Lazarus
*Assistant Examiner*—William R. Briggs
*Attorney, Agent, or Firm*—Duckworth, Hobby, Allen & Pettis

[57] ABSTRACT

The apparatus includes a first conveyor for carrying dough portions in a first direction, and a second, endless conveyor for carrying the dough portions in a second direction out of plane with the first direction, the second conveyor having a pickup end immediately adjacent the first conveyor and a discharge end for delivering the dough portions to the pans. The cross-sectional dimension of the second conveyor at the pickup end is relatively thin, in order to insure that all of the dough portions are conveyed onto the second conveyor. A third conveyor is provided having a pickup portion underneath the discharge end of the second conveyor, such that pans fed onto the third conveyor receive the dough portions from the discharge end of the second conveyor.

20 Claims, 5 Drawing Figures

APPARATUS FOR DEPOSITING DOUGH ONTO PANS THEREFOR

BACKGROUND OF THE INVENTION

1. Field of the Invention

The present invention relates to machinery for picking up and depositing raw dough onto pans, and more particularly to a machine which functions automatically and continuously to deposit rectangular strips of raw dough onto pans to form a dough product which can be easily baked as a sandwich-type bun.

2. Description of the Prior Art

There are a number of prior art arrangements for automatically cutting and depositing gobs of dough into pans, such that the dough may subsequently be baked. For example, Roth et al disclose, in U.S. Pat. No. 3,596,613, automatic machinery for continuously cutting and depositing gobs of raw dough into pans.

In U.S. Pat. No. 2,018,950, Couture discloses an assembly line technique for making sandwich-type biscuits. Other prior art references of interest include the following U.S. Pat. Nos. 3,397,655 to Valadez; 2,970,268 to Doolin; 2,780,182 to Rand; 2,602,392 to Pankin; 3,111,913 to Maadek; 2,352,447 to Powers; 2,186,807 to Newberger; 2,014,384 to Kruttschnitt; 2,570,374 to Pompa; and U.S. Pat. No. Re. 22,399 to Fonken.

SUMMARY OF THE INVENTION

The present invention contemplates apparatus for delivering a plurality of dough portions to a pan therefor and comprises a first conveyor for carrying the dough portions in a first direction. A second, endless conveyor is provided for carrying the dough portions in a second direction out of plane with the first direction, the endless conveyor having a pickup end immediately adjacent the first conveyor and a discharge end for delivering the dough portions to the pans. Means are provided for picking up the dough portions from the first conveyor and depositing the dough portions on the pans at the discharge end of the second conveyor, and a third conveyor is provided having a pickup portion positioned underneath the discharge end of the endless conveyor. Means are also provided for feeding pans onto the third conveyor whereby the pans receive the dough portions from the discharge end of the second conveyor.

In a preferred embodiment of the present invention, the pickup means comprises the combination of means for elevating a portion of the first conveyor immediately adjacent and forward of the pickup end of the second conveyor, and the utilization of a second conveyor having a dimension at the pickup end which is relatively small in comparison to the vertical lift ability of the dough portions being conveyed. For example, suitably the radius of the pickup end is not more than three times the thickness of the dough portions being picked up.

Another aspect of the preferred embodiment of the present invention contemplates the employment of a cantilevered housing for the second and third conveyors, which housing can be moved into and out of position adjacent the first conveyor as required, without changing the position of the first conveyor. The third conveyor is driven by means independent of operation of the first and second conveyors and which allows the third conveyor to be driven at a feed rate in excess of the rate of the second conveyor, in order to obtain a spacing between adjacent rectangular dough portions in a direction substantially parallel with the direction of feed of the third conveyor, after discharge of the rectangular dough portions from the discharge end of the second conveyor.

THE DRAWING

FIG. 4 is an end view of a portion of the apparatus shown in FIG. 1, taken through the lines 4—4 and with the dough portions shown in FIG. 1 also included.

FIG. 5 is a schematic illustration of the conveyor system utilized in the embodiment shown in FIG. 1, in which a portion is cut away.

DETAILED DESCRIPTION

A detailed description of the preferred embodiment in accordance with the present invention will now be described with reference to the drawings. In accordance with the present invention, the apparatus, which is referred to generally as 10, includes a plurality of conveyors which cooperate together to cause the dough portions to be discharged onto pans which are conveyed from underneath a discharge conveyor, so as to allow the dough portions to fall onto the pans in the desired manner.

Figure 1:
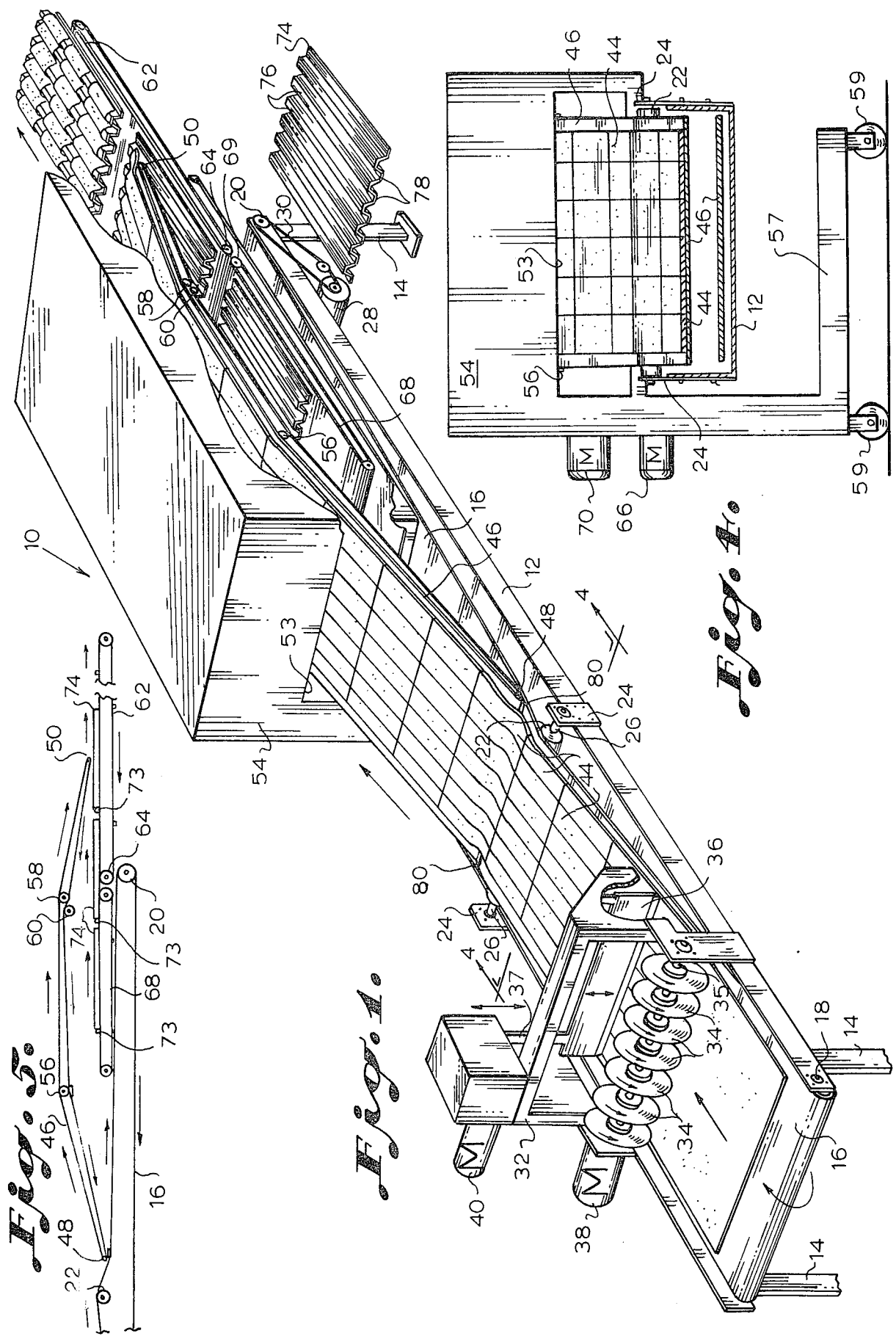
FIG. 1 is a perspective view, partially cut away, of one embodiment of apparatus in accordance with the present invention.

With specific reference to FIGS. 1 and 5, the apparatus 10 includes a support table 12 carried by legs 14, and having a first endless conveyor 16 supported by the table 12 and rotatable about two rollers 18, 20 at the extremities of the table. A third roller 22 intermediate the two ends of the first conveyor 16 elevates a portion of the first conveyor, the third conveyor being carried by a pin 26 supported by brackets 24 mounted on opposite sides of the table 12. The first conveyor is driven by a first motor 28 supported underneath the table 12, and which is coupled to the roller 20 via a drive belt 30.

The apparatus 10 further includes a cutting mechanism, referred to generally as 32. The cutting mechanism 32 includes a plurality of circular cutting discs 34 driven by a shaft 35 extending laterally across the first conveyor 16 driven by a motor 38. A lateral cutting blade 36 is mounted forward of the longitudinal cutting blade 34 in the direction of feed along the first conveyor 16, and is driven by a shaft 37 from a motor 40, to effect a reciprocal motion of the lateral cutting blade 36 in the direction shown by arrows immediately adjacent thereto (note FIG. 4). As will be described in greater detail below with reference to the operation of the apparatus 10, a continuous layer of dough 42 is carried by the first conveyor 16 in the direction of feed, and is cut by the longitudinal cutting blades 34 and the lateral cutting blade 36 into a matrix of rectangular dough portions 44, in which the long sides of each rectangular dough portion is substantially parallel with the direction of feed of the first conveyor 16. It will be understood, however, that other shapes of dough portions may also be cut and conveyed by the apparatus 10.

The apparatus 10 further includes a second, endless conveyor 46 having a pickup end 48 and a discharge end 50, each end of which is supported by a roller indicated by a corresponding number in FIG. 1. Additionally, the apparatus 10 further includes a chamber 54 into which the second conveyor 46 passes, with additional rollers 56, 58 and 60 pinned between the inner walls of the housing 54 and supporting the second conveyor 46 in an elevated position with respect to the plane of the first conveyor 16 and the table 12. Also included is a third endless conveyor supported at one end by a roller 64 which is driven by a motor 66 (FIG. 4). The third conveyor 62 is positioned so as to pass directly underneath the discharge end 50 of the second conveyor 46.

A fourth endless conveyor is rotatably supported within the housing 54 by a corresponding roller at either end, the discharge end 69 of the fourth roller extending adjacent the pickup end of the third roller 62. As shown in FIGS. 1 and 5, the fourth conveyor 68 is positioned directly underneath the elevated portion of the second conveyor 46. The third conveyor 62 and the fourth conveyor 68 may be driven by a common motor 70 (see FIG. 4), via a drive belt (not shown) in a conventional manner. The third and fourth conveyors 62 and 68 include dogs 73 for carrying the pans 74 along.

Reference is now made to FIGS. 1 and 4. The housing 54 is mounted in a cantilevered fashion by a support 55 onto a base 57 having wheels 59 thereon, such that the entire housing may be easily wheeled into position with the pickup end 48 of the second conveyor 46 adjacent the first conveyor 16. The elevating roller 22 is then installed under the first conveyor 16, and the entire apparatus is ready for operation. It will thus be understood by those skilled in the art that the sub-combination of conveyors 46, 62 and 68 with the housing 54 may be employed with a conventional bakery conveyor and cutter assembly in a facile manner.

Figure 3:
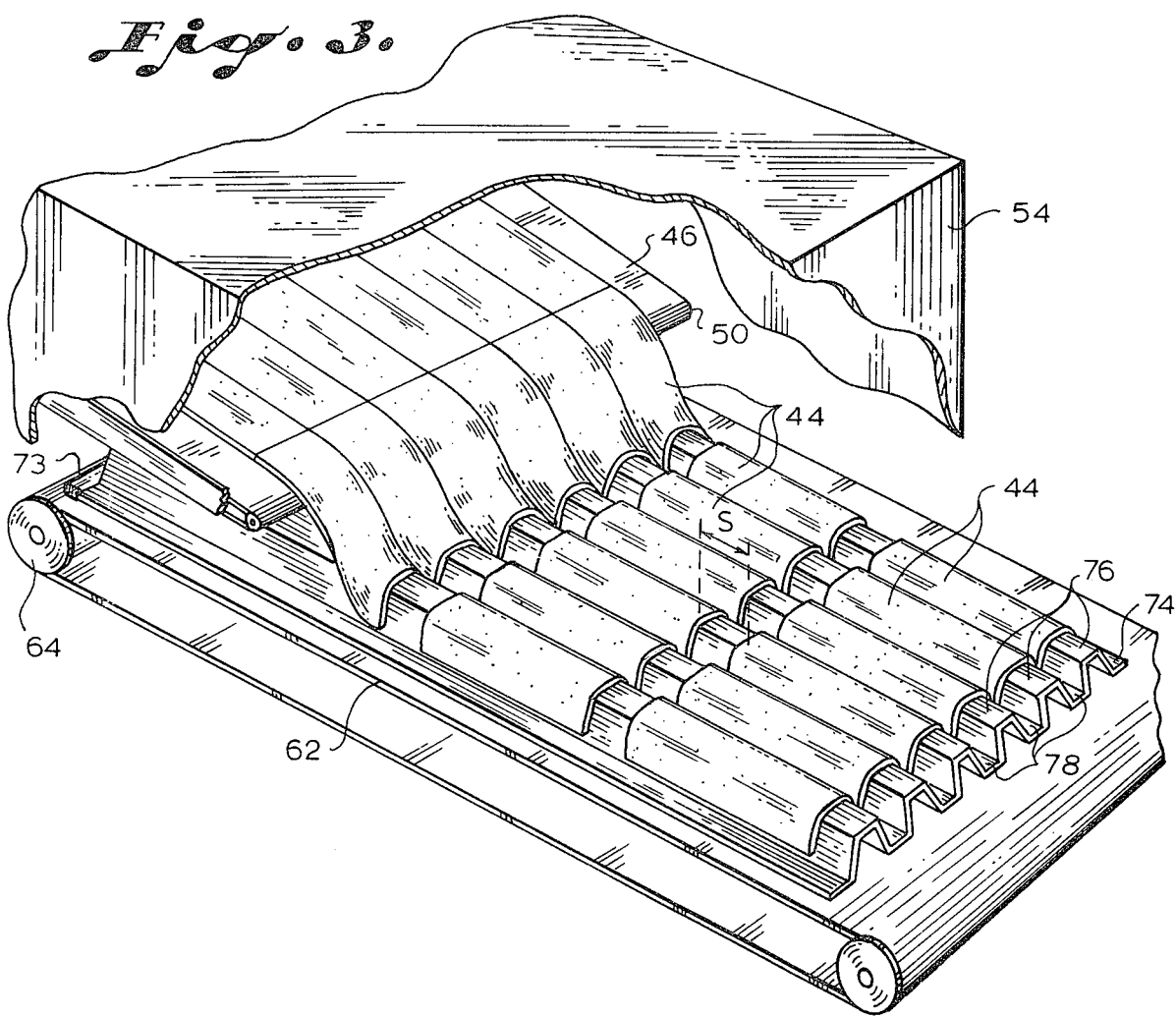
FIG. 3 is a perspective view illustrating a portion of the apparatus of FIG. 1.

Pans adapted to receive the dough portions 44 at the discharge end 50 of the second conveyor 46 are identified as 74 in FIGS. 1 and 3. Each pan may include a plurality of longitudinal ridges 76 and grooves 78, which extend in the direction of feed of the third conveyor 62, when each pan is properly positioned on that conveyor.

As has been described above, the present invention contemplates utilization of means to facilitate delivery of the rectangular dough portions 44 from the first conveyor 16 and onto the pickup end 48 of the second conveyor 46. With specific reference to FIGS. 1 and 2, this pickup means includes the positioning of the pickup end 48 of the second conveyor 46 immediately adjacent the elevated portion of the first conveyor 16 along the direction of feed of that first conveyor from the elevating roller 22, and the use of a conveying surfaces for the second conveyor 46 which allows that conveyor to have a relatively small cross-sectional dimension at the pickup end with respect to the thickness of each dough portion 44. In order to achieve this, it is preferred to utilize a wire-mesh type of conveyor for the second conveyor 46. Suitably, the cross-sectional radius of the roller 48 is not greater than three times the thickness of the dough portions 44 being conveyed. As thus dimensioned, the dough portions 44 will "walk" across the pickup end 48 onto the conveyor 46. Additionally, the apparatus 10 is provided with a deflector bar 80 which extends laterally across the first conveyor 16 and underneath the pickup end 48 of the second conveyor 46.

Figure 2:
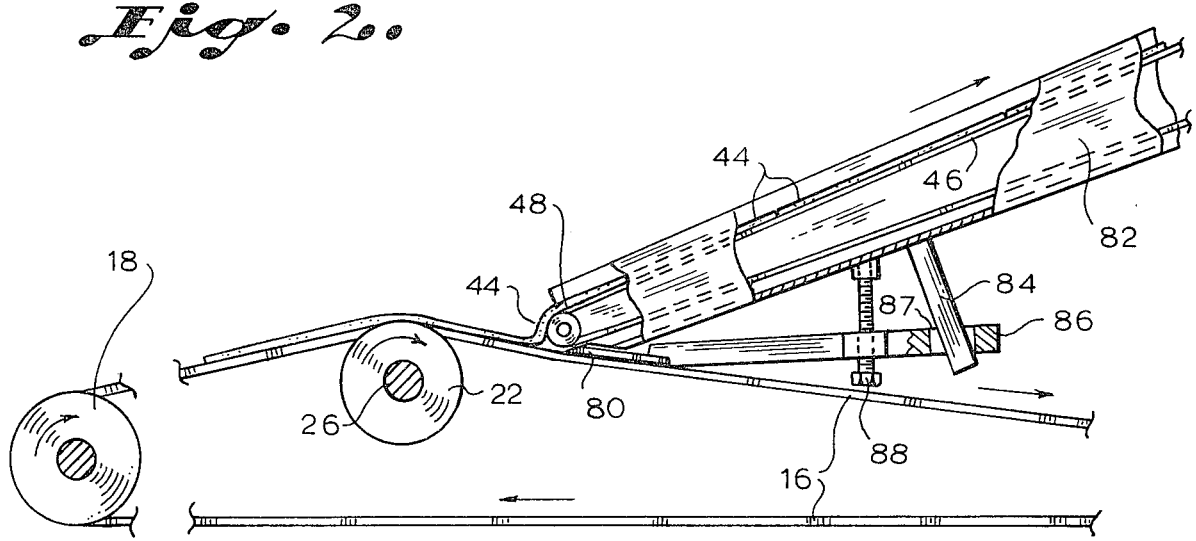
FIG. 2 is a side view of a portion of the apparatus in FIG. 1, partially cut away.

As shown in FIG. 2, the deflector bar 80 comprises a relatively thin, flat member. The second conveyor 46 includes a supporting side panel 82 on opposite sides of the conveyor, but which is omitted in FIG. 1 in order to allow illustration of the operation of that conveyor. The side panel 82 includes a pin 84 extending from the bottom surface thereof, the pickup bar 80 being supported by a plate 86 having an aperture 87 at one end thereof to receive the pin 84 extending from the bottom of the side panel 82. The plate 86 further includes a threaded bias screw 88 extending therethrough and bearing against the underside of the side panel 82, in order to provide for minor angular adjustments of the pickup bar 80 with respect to the plane of the first conveyor 16.

Operation of the apparatus 10 will now be described.

Initially, the housing 54 is set up over the first conveyor 16 in the manner described above and shown in FIG. 4, and a flat, continuous layer of dough 42 is fed onto the first conveyor 16 and passed through the cutting mechanism 32 so as to obtain the matrix of rectangular dough portions 44. As operation of the first conveyor 16 is maintained, these dough portions 44 move across the elevated portion of the first conveyor 16 at the elevating roller 22, and are fed onto the pickup end 48 of the second conveyor 46. As shown in FIG. 2, this pickup operation is facilitated by the elevation of the first conveyor at that point and the dimension of the second conveyor 46 at the pickup end 48, as described above. The pickup bar 80 separates the second conveyor 46 from the first conveyor 16 and preventds the wire-mesh of the second conveyor from snagging on the lacings of the first conveyor.

The dough portions 44 are then continuously conveyed across the second conveyor and into the house 54, and thence to the discharge end 50. Simultaneously, pans 74 are fed onto the fourth conveyor 68, and thus onto the pickup end 64 of the third conveyor 62. Now noting FIG. 3, the rectangular dough portions 44 are fed off of the discharge end of the second conveyor 46, the second conveyor 46, the third conveyor 62 and the pans 74 being dimensioned such that each dough portion 44 is deposited onto one of the ridges 76 of each pan. Additionally, the third conveyor 62 is driven by motor 66 at a rate of feed which is greater than that of the second conveyor 46, in order to obtain a spacing (identified as "s" in FIG. 3) as a result of that increased speed. Thus, after a plurality of the rectangular dough portions 44 are deposited on a single one of the pans 74, each pan may be automatically inserted in a proof box or rack for a sufficient time before baking each dough portion 44 into a sandwich-type bun which is particularly suited for "hot dogs", cuban sandwiches and the like.

It will of course be understood by those skilled in the art that the various conveyors shown may be driven independent of each other, or certain of the conveyors may be operated by common drive means, with the exception of the third conveyor 62 when it is desired to effect the spacing between adjacent dough portions 44 in the manner described above. Various other modifications and alternate arrangements may be utilized with the above-described embodiment.

I claim:

1. Apparatus for delivering a plurality of dough portions to a pan therefor, comprising:
   (a) a first, flexible conveyor for carrying said dough portions in a first direction;
   (b) a second, endless conveyor for carrying said dough portions in a second direction out of plane with said first direction, said endless conveyor having a pickup end immediately adjacent said first conveyor and a discharge end for delivering said dough portions to said pans;
(c) means for picking up said dough portions from said first conveyor at a point intermediate the ends of said conveyor and depositing said dough portions on said pickup end of said second conveyor, said pick up means comprising means elevating a portion of said first conveyor, with respect to the remainder of said first conveyor, immediately adjacent said pickup end of said second conveyor;
(d) a third conveyor having a pickup portion positioned underneath said discharge end of said second conveyor; and
(e) means feeding said pans onto said third conveyor whereby said pans receive said portions from said discharge end of said second conveyor.

2. The apparatus recited in claim 1 wherein said pickup means comprises said second conveyor having an outer cross-sectional radius at said pickup end which is not greater than three times the thickness of said dough portions.

3. The apparatus recited in claim 2 wherein said pickup means further comprises a deflector bar extending immediately between said first conveyor and said pickup end of said second conveyor.

4. The apparatus recited in claim 2 whrein said pickup means further comprises a deflector bar extending immediately between said first conveyor and said pickup end of said second conveyor.

5. The apparatus recited in claim 1 further comprising means driving said third conveyor independent of operation of said first and second conveyors.

6. The apparatus recited in claim 5 wherein said dough conveyor driving means further comprises means operating said third conveyor at a feed rate greater than the feed rate of said second conveyor.

7. The apparatus recited in claim 1 wherein said pan feeding means comprises a fourth conveyor positioned under said second conveyor, said fourth conveyor having a discharge end adjacent said pickup portion of said third conveyor.

8. The apparatus recited in claim 1 further comprising means for cutting a continuous layer of dough on said first conveyor into said dough portions, said cutting means comprising:
a plurality of longitudinal cutting blades positioned adjacent said first conveyor and substantially parallel with said first direction for cutting said continuous dough layer into a plurality of strips; and
a lateral cutting blade adjacent said first conveyor for cutting said dough layer along a plurality of spaced lines substantially transverse to said first direction.

9. The apparatus recited in claim 1 wherein said second conveyor is formed of a wire mesh.

10. Apparatus for transporting and cutting a continuous dough layer into a plurality of dough portions and delivering said dough portions to a pan therefor, comprising:
(a) a first conveyor for carrying said dough portions in a first direction;
(b) means adjacent said first conveyor for cutting said continuous dough layer while moving along said first conveyor into a matrix of dough portions;
(c) a second, continuous conveyor for carrying said dough portions in a second direction out of plane with said first direction, said second conveyor having a pickup and immediately adjacent said first conveyor and a discharge end for delivering said dough portion to said pans;
(d) means for picking up said dough portions from said first conveyor and depositing said dough portions on said pickup end of said second conveyor, said pickup means including said second conveyor having a cross-sectional radius not greater than three times the thickness of said dough portions and means elevating a portion of said first conveyor immediately adjacent said pickup end of said second conveyor;
(e) a third conveyor having a pickup portion positioned underneath said discharge end of said second conveyor; and
(f) means feeding said pans onto said third conveyor whereby said pans receive said dough portions from said discharge end of said second conveyor.

11. The apparatus recited in claim 10 wherein said pickup means further comprises a deflector bar between said first and second conveyors at said pickup end.

12. The apparatus recited in claim 10 wherein said pan comprises a member having a plurality of ridges and grooves extending substantially in the direction of feed of said third conveyor when carried thereby.

13. The apparatus recited in claim 12 wherein said cutting means further comprises means for defining said matrix as a plurality of rectangular dough portions, with the long sides of each dough portion substantially parallel with said first direction and wherein said first, second and third conveyors and said pan are aligned such that each rectangular dough portion is deposited along one of said ridges of said pan at said discharge end of said second conveyor.

14. The apparatus recited in claim 13 further comprising means operating said third conveyor independent of operation of said second conveyor and at a greater feed rate than said second conveyor, to effect a spacing between said rectangular dough portions along each ridge in a direction substantially parallel with the direction of feed of said third conveyor.

15. Apparatus for delivering a plurality of dough portions to a pan therefor, said apparatus adapted for use with a first, flexible conveyor for transporting said dough portions in a first direction, said apparatus comprising:
means elevating a portion of said first conveyor with respect to the remainder of said first conveyor, said elevated portion being between the ends of said first conveyor;
a second conveyor having a pickup end and a discharge end;
a third conveyor positioned under said discharge end of said second conveyor;
means for supporting said second and third conveyors over said first conveyor with said pickup of said second conveyor justapositioned adjacent said first conveyor at said elevated portion thereof along said first direction from said elevating means; and
means feeding said pans onto said third conveyor whereby said pans receive said portions from said discharge end of said second conveyor.

16. The apparatus recited in claim 15 wherein said supporting means comprises a portable housing cantilevered over said first conveyor, said housing movable into and out of position over said first conveyor.

17. The apparatus recited in claim 16 further comprising a deflector bar carried by said housing and mounted under said pickup end of said second conveyor.

18. The apparatus recited in claim 15 further comprising a fourth conveyor carried by said supporting means, said forth conveyor supported under said second conveyor for feeding pans onto said third conveyor.

19. Apparatus for picking up relatively thin, pliable workpieces from a first, flexible conveyor transporting said workpieces in a first direction, said pickup apparatus comprising:

means elevating a portion of said first conveyor with respect to the remainder of said first conveyor between the ends of said first conveyor; and a second conveyor having a pickup end positioned immediately adjacent said first conveyor along said first direction adjacent said elevating means, said conveyor having a cross-sectional radius at said pickup end not exceeding three times the thickness of said workpieces.

20. Apparatus for handling dough portions said apparatus comprising:

a first, flexible conveyor for transporting said dough portions in a first direction;

a second conveyor having a pickup end and a discharge end;

a portable housing supporting said second conveyor and cantilevered over, and between the ends of said first conveyor, said housing movable into and out of position over said first conveyor such that said pickup end of said second conveyor is immediately adjacent said first conveyor; and means picking up said dough portions traveling along said first conveyor and depositing said dough portions on said pickup end of said second conveyor, said pickup means including means elevating a portion of said first conveyor immediately adjacent the pickup end of said second conveyor.

* * * * *